(12) United States Patent
Osswald

(10) Patent No.: US 9,425,639 B2
(45) Date of Patent: Aug. 23, 2016

(54) INDUCTIVE CHARGING DEVICE AND CONTROL METHOD

(75) Inventor: Alexander Osswald, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 905 days.

(21) Appl. No.: 13/535,219

(22) Filed: Jun. 27, 2012

(65) Prior Publication Data

US 2013/0009594 A1    Jan. 10, 2013

(30) Foreign Application Priority Data

Jul. 8, 2011   (DE) .......................... 10 2011 078 883

(51) Int. Cl.
*H02J 7/02*   (2016.01)
*H02J 5/00*   (2016.01)
(52) U.S. Cl.
CPC *H02J 7/025* (2013.01); *H02J 5/005* (2013.01)
(58) Field of Classification Search
CPC ...................................................... H02J 7/025
USPC ........................................................ 320/108
See application file for complete search history.

(56) References Cited

U.S. PATENT DOCUMENTS

| 6,803,744 | B1 | 10/2004 | Sabo | |
| 2011/0221387 | A1* | 9/2011 | Steigerwald | B60L 11/182 320/108 |
| 2012/0217111 | A1* | 8/2012 | Boys et al. | 191/10 |

* cited by examiner

*Primary Examiner* — Thuan Do
(74) *Attorney, Agent, or Firm* — Norton Rose Fulbright US LLP

(57) ABSTRACT

A charging device for a rechargeable energy store which has a first induction coil includes: a coupling surface for positioning the first energy store; a second induction coil for generating a magnetic field in the area of the coupling surface to transfer electrical energy between the first and second induction coils; and a direction control system for bringing an alignment of the field of the second induction coil in line with an alignment of the first induction coil.

8 Claims, 3 Drawing Sheets

INDUCTIVE CHARGING DEVICE AND CONTROL METHOD

BACKGROUND OF THE INVENTION

1. Field of the Invention

The present invention relates to a charging device, e.g., for inductive charging of an energy store, a method for controlling a charging operation, and a corresponding computer program product.

2. Description of the Related Art

An accumulator which may be used, for example, to supply electrical energy to a small power device, is rechargeable with the aid of a corresponding charging unit. The accumulator and the charging unit may be connected to each other with the aid of electrical contacts, or a system of induction coils may be used to transmit electrical energy from the charging unit to the accumulator. The accumulator has a first energy coil which is configured to convert an external alternating magnetic field into a current which is used to recharge the accumulator following appropriate preparation. The charging unit has a corresponding second induction coil and is configured to generate the alternating electrical field, so that the two induction coils are coupled to each other in the manner of a transformer.

U.S. Pat. No. 6,803,744 B1 shows a charging unit which has a system of a plurality of second induction coils to facilitate an alignment of the accumulator with the first induction coil. In one specific embodiment, it is also shown that the induction coils may be moved relative to each other to achieve an improved magnetic coupling between the induction coils.

BRIEF SUMMARY OF THE INVENTION

The object of the present invention is to provide a charging device which provides a further improved magnetic coupling between the induction coils. Another object of the present invention is to provide a method and a computer program product for controlling a charging operation.

A charging device according to the present invention for a rechargeable energy store which has a first induction coil includes a coupling surface for positioning the first energy store, a second induction coil for generating a magnetic field in the area of the coupling surface to transfer electrical energy between the induction coils, and a direction control system for bringing an alignment of the field of the second induction coil in line with an alignment of the first induction coil.

It has been demonstrated that, to improve the magnetic coupling between the induction coils, it may be more effective to bring the alignment of the magnetic field in line with the alignment of the first induction coil than to move the induction coils relative to each other, in particular if the coupling surface is not much larger than the first induction coil.

In a first specific embodiment, the direction control system includes pivoting means for setting an elevation and rotating means for setting an azimuth in the second induction coil in relation to the coupling surface. A fast and accurate change in the alignment of the field of the second induction coil may be achieved with the aid of such a mechanical pivoting or rotation of the second induction coil.

In another specific embodiment, the direction control system includes multiple differently aligned subcoils, which are configured to generate magnetic subfields which are superimposed to form the magnetic field in the area of the coupling surface. In this way, the alignment of the magnetic field may be changed without requiring a mechanical movement of elements of the charging device. The superimposition of the magnetic subfields may result in the fact that the magnetic field is strengthened in the area of the first induction coil, whereby a transmittable amount of energy between the induction coils may be increased. By eliminating a mechanical tilting device, a distance between the induction coils or between the second induction coil and the surface may be reduced, whereby the magnetic coupling between the induction coils may be further improved.

In one specific embodiment, the charging device additionally includes a drive device for moving the second induction coil along the coupling surface in such a way that a position of the second induction coil is brought in line with a position of the first induction coil. The advantages of the alignment of the positions of the induction coils may thus be combined with the advantages of adjusting the alignments of the induction coils. Due to the combination, a mechanical complexity of the overall approach may be less than the sum of the complexities for the two individual approaches. This makes it possible to reduce the manufacturing and maintenance costs.

The charging device may include a control device for controlling the direction control system and/or the drive device, the control device being designed to permit the second induction coil to follow a movement of the first induction coil with regard to the coupling surface.

This makes it possible to support a charging operation in a harsh environment in which it is not possible to guarantee that the rechargeable energy store assumes a constant position or alignment in relation to the coupling surface. Conditions of this type may prevail, in particular, on board a motor vehicle, a ship or another means of transportation.

In one specific embodiment, the induction coils are configured to transmit energy in any direction. As an alternative to the inductive energy supply of the energy store, an inductive removal of energy from the energy store may also be made possible.

A method according to the present invention for controlling a charging operation of a rechargeable energy store having a first induction coil with the aid of the described charging device includes the steps of determining a first electrical power transmittable between the induction coils, changing the alignment of the magnetic field of the second induction coil in relation to the alignment of the first induction coil, determining a second electrical power transmittable between the induction coils, and changing the alignment of the magnetic field of the second induction coil on the basis of the comparison, for the purpose of maximizing the electrical power transmittable between the induction coils.

Due to the method, the alignment of the magnetic field of the second induction coil may be successively brought in line with the first induction coil, a rapidly converging optimization algorithm being able to be used, so that an optimum alignment may be quickly and reliably found.

In addition to the alignment of the magnetic field, a position of the second induction coil in relation to the first induction coil may also be changed. The alignment and the position may be changed successively or simultaneously in multiple runs of the method for the purpose of supporting the rapid convergence of the optimization algorithm.

A computer program product may include program code means for carrying out the described method, the computer program product being executed on a processing device or being stored on a computer-readable data carrier.

DETAILED DESCRIPTION OF THE INVENTION

Figure 1:
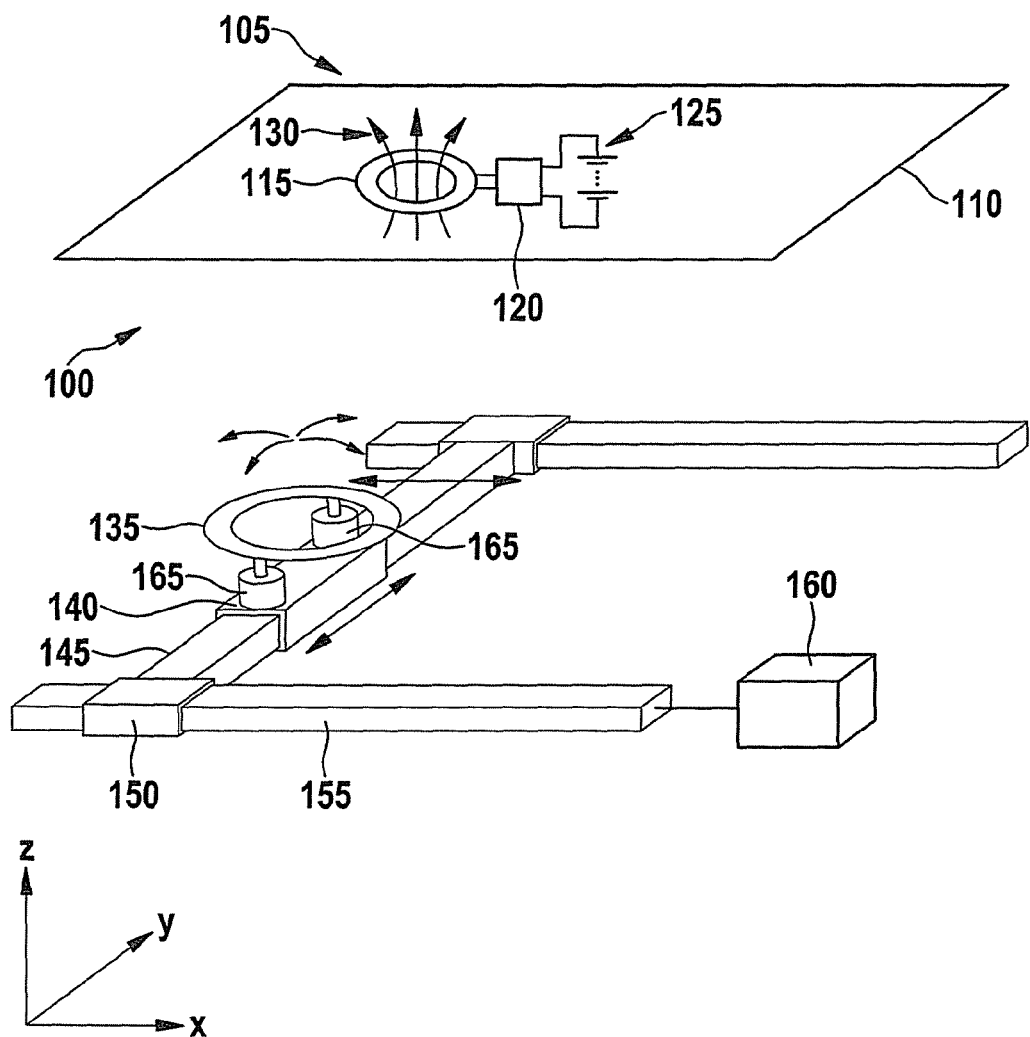
FIG. 1 shows a charging device having a rechargeable energy store.

FIG. 1 shows a charging device 100 for charging a rechargeable energy store 105. To facilitate referencing, a Cartesian coordinate system is specified. Charging device 100 includes a coupling surface 110 which is represented with an upward displacement in the manner of an exploded drawing.

Energy store 105 includes a first induction coil 115, which is connected to an electrical storage device 125 with the aid of a control device 120. First induction coil 115 preferably includes an electrical conductor which is wound multiple times in a circular shape. The first induction coil provides control device 120 with an electrical alternating current as a function of an alternating magnetic field 130 flowing through first induction coil 115. Control device 120 converts the alternating current into a direct current and controls it in such a way that electrical storage device 125 may be recharged therefrom. Storage device 125 may be a capacitor, in particular a double layer capacitor, or an accumulator, in particular a nickel metal hydride or lithium ion accumulator.

Coupling surface 110 is represented as a flat rectangle, although coupling surface 110 may also have a different shape, in particular a curved shape in other specific embodiments. Coupling surface 110 is also not limited to being situated largely perpendicularly to the force of gravity.

Charging unit 100 includes a second induction coil 135, which is mounted on a first carrier 140 which is movable in the y direction with respect to a first rail 145. First rail 145 is mounted on a second carrier 150, which is movable along a second rail 155 in the x direction. By correspondingly moving first carrier 140 and second carrier 150, second induction coil 135 is fully movable on the x-y plane parallel to contact surface 110. In another specific embodiment, second induction coil 135 may also be moved in a way other than with the aid of carriers 140 and 150, for example with the aid of a moving device having a polar orientation.

Second induction coil 135 is mounted on first carrier 140 with the aid of one or multiple alignment elements 165, alignment elements 165 permitting the second induction coil to pivot around the y axis and around the x axis.

The movements of alignment elements 165 of first carrier 140 and second carrier 150 may be controlled with the aid of a control device 160, which is connected to the corresponding moving elements. Control device 160 is furthermore configured to control second induction coil 135 in such a way that it generates magnetic field 130 in the area of coupling surface 110. The position and alignment of the magnetic field in relation to coupling surface 110 and, if necessary, also the strength of magnetic field 130 may thus be changed with the aid of control device 160. Control device 160 is configured to move second induction coil 135 in such a way that the position and alignment of second induction coil 135 are optimized in the sense of an optimized magnetic coupling between first induction coil 115 and second induction coil 135. For this purpose, induction coils 115, 135 must be situated in such a way that they are located as close to each other as possible, while magnetic field 130 of second induction coil 135 flows perpendicularly through first induction coil 115.

Figure 2:
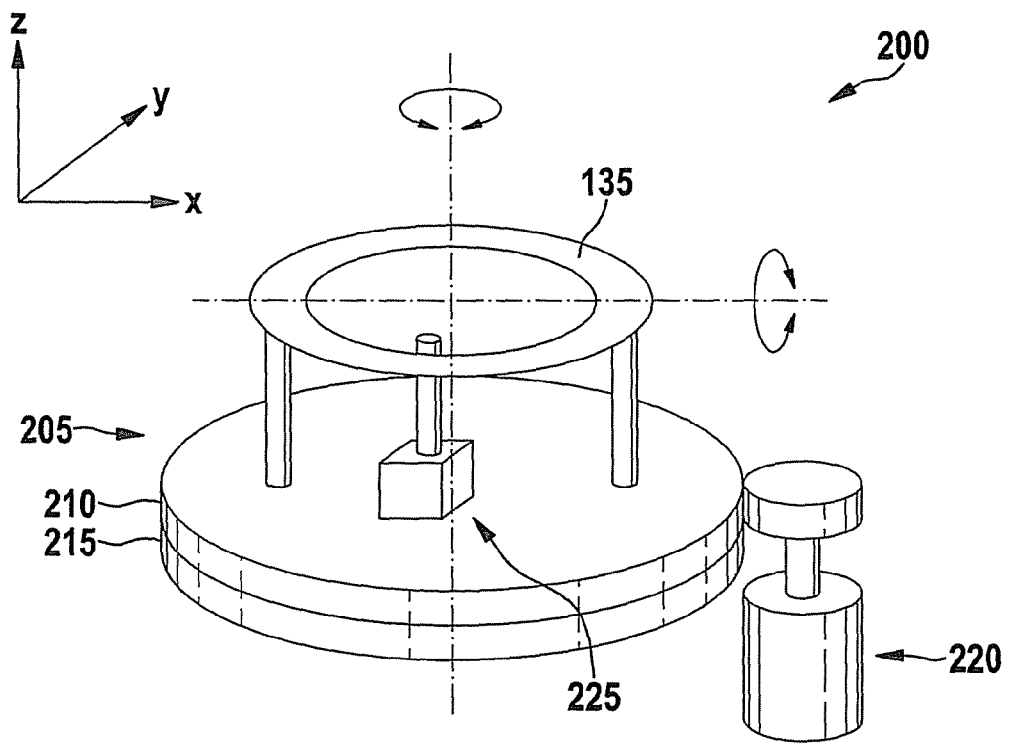
FIG. 2 shows a direction control system for the charging device from FIG. 1.

FIG. 2 shows a direction control system 200 for charging device 100 from FIG. 1. Direction control system 200 represents an alternative means of attaching second induction coil 135 to first carrier 140 in the specific embodiment of charging device 100 illustrated in FIG. 1. An additionally drawn coordinate system corresponds to the one in FIG. 1.

Direction control system 200 includes a platform 205 for attachment to first carrier 140. Platform 205 includes an upper section 210 and a lower section 215, lower section 215 being configured for attachment to first carrier 140, while upper section 210 supports second induction coil 135. Upper section 210 is designed to be rotatable around the z axis in relation to lower section 215, with the aid of a first drive device 220.

Second induction coil 135 is attached to upper section 210 of platform 205 with the aid of a second drive device 225 in such a way that second induction coil 135 is pivotable around an axis which runs parallel to the x-y plane and corresponds to the x axis in the representation in FIG. 2. If upper section 210 is rotated around the z axis in relation to lower section 215 of the platform, the axis around which second induction coil 135 is pivotable is also rotated. An azimuth (direction angle) may thus be changed with the aid of first drive device 220, and an elevation (height angle) of second induction coil 135 may be changed with the aid of second drive device 225. The alignment of second induction coil 135 in relation to the x-y plane is thus freely adjustable. The alignment of a magnetic field generated with the aid of second induction coil 135 also changes with the alignment of the second induction coil.

Figure 3:
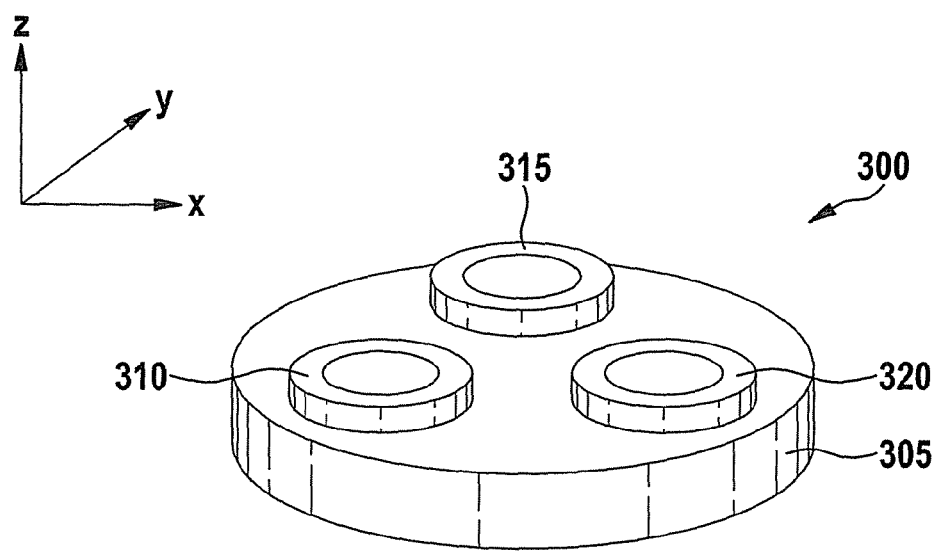
FIG. 3 shows another direction control system for the charging device from FIG. 1.

FIG. 3 shows another direction control system 300 for charging device 100 from FIG. 1. As with charging device 200 from FIG. 2, charging device 300 from FIG. 3 is configured to provide an alternative attachment of second induction coil 235 to first carrier 140 of charging device 100 from FIG. 1 and to simultaneously permit a change in the alignment of magnetic field 130 which may be generated by second induction coil 135. A specified Cartesian coordinate system corresponds to the coordinate systems in FIGS. 1 and 2.

Direction control system 300 includes a platform 305 similar to platform 205, platform 305, however, having a rigid design. Subcoils 310 through 320, whose alignments differ from each other, are situated on the upper side of platform 305. In the illustrated specific embodiment, the three subcoils 310 through 320 are inclined toward each other in such a way that axes, each of which runs perpendicularly through individual subcoils 310 through 320, intersect above platform 305 at a point on the z axis. In other specific embodiments, subcoils 310 through 320 may also have other relative alignments or arrangements.

Each of subcoils 310 through 320 is configured to generate a magnetic subfield, the generated subfields being superimposed on each other to form magnetic field 130 in the area of coupling surface 110, which is not illustrated, above platform 305. Depending on the relative alignment of subcoils 310 through 320 and the relative strengths of the generated magnetic subfields, magnetic field 130 runs in a predetermined alignment in relation to the x-y plane in the area of coupling surface 110.

Figure 4:
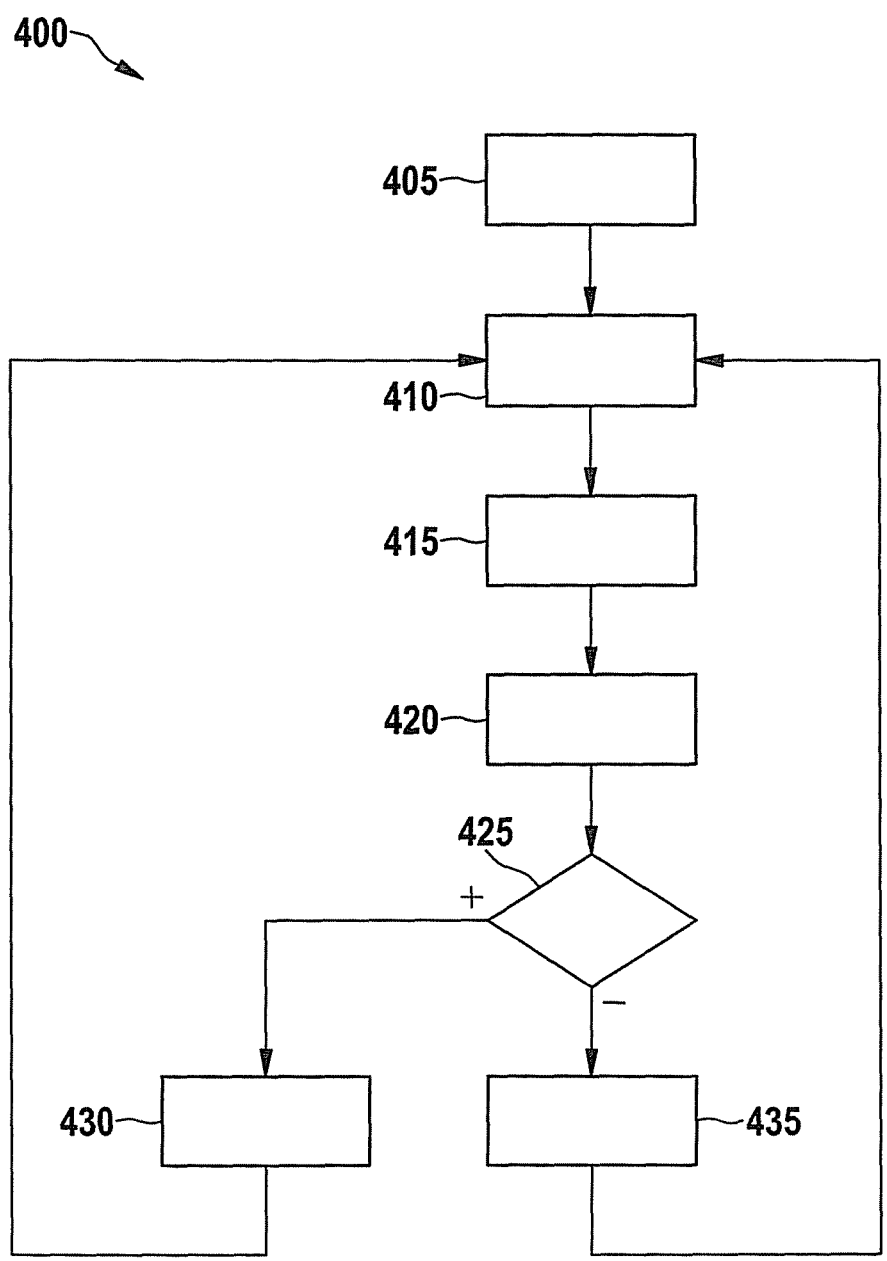
FIG. 4 shows a flow chart for a method for controlling the charging device from FIG. 1.

FIG. 4 shows a flow chart of a method 400 for controlling charging device 110 from FIG. 1.

A first electrical power, which is transmittable between induction coils 115 and 135, is determined in a first step 405. This may be done by control device 160 providing an alternating voltage to second induction coil 135, which subsequently generates an alternating magnetic field 130 in the area of coupling surface 110, so that alternating field 130 may be absorbed by first induction coil 115 and converted back into an electrical current. A current intensity resulting from second induction coil 165 provides an indication of the first transmittable power.

A changed alignment and/or a changed position of second induction coil 135 is/are determined in a subsequent step 410. The determined alignment and/or position is/are implemented in a subsequent step 415 by controlling carriers 140 and 150 or drive devices 220, 225 or subcoils 310 through 320.

In a subsequent step 420, a second transmittable power between induction coils 115 and 135 is determined similarly to step 405. The first determined power is compared with the second determined power in a step 425. If the first power is less than the second power by a predetermined amount, method 400 continues with a step 430, otherwise it continues with a step 435. The amount may be predetermined for the purpose of influencing a sensitivity of method 400. The amount may be set to zero for a maximum sensitivity and thus a maximum optimization of the position of second induction coil 135 and the alignment of its magnetic field 130 in relation to first induction coil 115 in each case.

In step 430, the first power determined in step 405 is set to the value of the second power determined in step 420. This step is carried out if the changed alignment and/or position in steps 410 and 415 has/have produced an increase in the transmittable power. The method may subsequently continue with step 410 to bring about a further improvement in the transmittable power.

Step 435 is carried out if the change in the alignment and/or position in steps 410 and 415 have produced a decrease in the transmittable power. In this case, the changed alignment and/or position is/are reversed, and method 400 continues with step 410 for the purpose of increasing the transmittable power by another change in steps 415 and 420.

What is claimed is:

1. A charging device for a rechargeable energy store which has a first induction coil, comprising:
    a contact surface for positioning the energy store;
    a second induction coil for generating a magnetic field in the area of the contact surface to transmit electrical energy between the first and second induction coils; and
    a direction control system for bringing the magnetic field of the second induction coil in alignment with the first induction coil,
    wherein the direction control system includes multiple differently aligned subcoils which are configured to generate magnetic subfields, and wherein the magnetic subfields are superimposed to form the magnetic field of the second induction coil in the area of the contact surface.

2. The charging device as recited in claim 1, wherein the direction control system includes: (i) a pivoting unit for setting an elevation of the second induction coil in relation to the contact surface; and (ii) a rotating unit for setting an azimuth of the second induction coil in relation to the contact surface.

3. The charging device as recited in claim 2, further comprising:
    a drive device for moving the second induction coil along the contact surface in such a way that a position of the second induction coil is brought in line with a position of the first induction coil.

4. The charging device as recited in claim 2, further comprising:
    a control device for controlling the direction control system in such a way that the second induction coil follows a movement of the first induction coil in relation to the contact surface.

5. The charging device as recited in claim 2, wherein the first and second induction coils are configured to transmit energy in any direction.

6. The charging device as recited in claim 1, wherein the second induction coil is mounted on a first carrier which is movable in the y direction with respect to a first rail, the first rail is mounted on a second carrier which is movable along a second rail in the x direction such that the second induction coil is configured to move on the x-y plane parallel to the contact surface.

7. The charging device as recited in claim 6, wherein the second induction coil is mounted on the first carrier via at least one alignment element, wherein the at least one alignment element permits the second induction coil to pivot around the y axis and around the x axis.

8. The charging device as recited in claim 7, further comprising:
    a control device for controlling the first carrier, the second carrier and the at least one alignment element so that the second induction coil follows a movement of the first induction coil in relation to the contact surface.

* * * * *